(12) United States Patent
Gunderwala

(10) Patent No.: US 11,725,548 B2
(45) Date of Patent: Aug. 15, 2023

(54) CAMLESS ENGINE

(71) Applicant: L&T TECHNOLOGY SERVICES LIMITED, Chennai (IN)

(72) Inventor: Murtuza Gunderwala, Bharuch (IN)

(73) Assignee: L&T TECHNOLOGY SERVICES LIMITED, Tamil Nadu (IN)

( * ) Notice: Subject to any disclaimer, the term of this patent is extended or adjusted under 35 U.S.C. 154(b) by 0 days.

(21) Appl. No.: 17/847,160

(22) Filed: Jun. 22, 2022

(65) Prior Publication Data

US 2022/0412237 A1 Dec. 29, 2022

(30) Foreign Application Priority Data

Jun. 23, 2021 (IN) .............................. 202141028233

(51) Int. Cl.
  *F01L 9/16* (2021.01)
  *F01L 9/40* (2021.01)
  *F02D 13/02* (2006.01)

(52) U.S. Cl.
  CPC  *F01L 9/16* (2021.01); *F01L 9/40* (2021.01); *F02D 13/0253* (2013.01); *F01L 2201/00* (2013.01); *F01L 2820/031* (2013.01); *F01L 2820/034* (2013.01); *F01L 2820/042* (2013.01)

(58) Field of Classification Search
  CPC . F01L 9/16; F01L 9/40; F01L 2201/00; F01L 2820/031; F01L 2820/034; F01L 2820/042; F02D 13/0253
  USPC ...................................................... 123/90.14
  See application file for complete search history.

(56) References Cited

U.S. PATENT DOCUMENTS

| | | | |
|---|---|---|---|
| 6,216,648 B1 * | 4/2001 | Spaulding | F02D 13/0284 123/65 PE |
| 6,340,009 B1 * | 1/2002 | Boecking | F01L 9/10 123/90.11 |
| 2006/0070591 A1 * | 4/2006 | Merwin | F01L 9/20 123/90.11 |
| 2009/0217894 A1 * | 9/2009 | Hedman | F01L 9/16 91/368 |
| 2010/0282225 A1 * | 11/2010 | Gilbert | F02D 17/023 251/12 |
| 2016/0237866 A1 * | 8/2016 | Hoglund | F15B 11/06 |

FOREIGN PATENT DOCUMENTS

DE  102013209041 A1 * 11/2014 .............. F01L 9/026

* cited by examiner

*Primary Examiner* — Jorge L Leon, Jr.

(57) ABSTRACT

The present disclosure relates to a camless engine in which a camless system is configured for controlling one or more engine valves of an internal combustion engine is disclosed. The system comprises a pneumatic accumulator configured to store compressed air, and at least one pneumatic actuator having a piston rod. The pneumatic actuator is configured for abutment with the engine valves of the internal combustion engine. The system further comprises at least one pneumatic control valve fluidly connected between the pneumatic accumulator and the pneumatic actuator, a sensor configured to sense an engine parameter and to transmit a signal to actuate the pneumatic control valves and an electronic control unit configured to control the pneumatic valves based on the signal received from the sensor.

18 Claims, 6 Drawing Sheets

CAMLESS ENGINE

CROSS-REFERENCE TO RELATED APPLICATIONS

The present application claims priority to Indian Patent Application No 202141028233 filed with the Intellectual Property Office of India on Jun. 23, 2021 and entitled "CAMLESS ENGINE," which is incorporated herein by reference in its entirety for all purposes.

FIELD OF THE INVENTION

The present disclosure is related, in general, to the field of an internal combustion engine. Particularly, but not exclusively, the present disclosure relates to a valve operating mechanism for the internal combustion engine. More particularly, the present disclosure discloses a camless engine in which a camless system is used to actuate the intake and exhaust valves of the internal combustion engine.

BACKGROUND OF THE INVENTION

The information in this section merely provides background information related to the present disclosure and may not constitute prior art(s) for the present disclosure.

In an internal combustion engine (ICE), whether diesel or gasoline-powered, engine valves serve to ventilate the combustion chamber. Intake valves allow the flow of pre-mixed air and fuel into the combustion chamber. Exhaust valves allow the exit of the combustion products. Between the intake and exhaust of the air-fuel mixture and combustion products, the valves seal the combustion chamber so that the resulting explosion may drive the piston to turn the crankshaft. A camshaft has been the primary means of controlling the inlet and exhaust valve's actuation and timing, and therefore, influencing the overall performance of the vehicle. The camshaft is attached to the crankshaft of the ICE and rotates relative to the rotation of the crankshaft. Therefore, as the vehicle increases its velocity, the crankshaft must turn more quickly, and ultimately the camshaft rotates faster. This dependence on the rotational velocity of the crankshaft provides the primary limitation on the use of camshafts. As the camshaft rotates, cam lobes, attached to the camshaft, interface with the engine's valves. This interface may take place via a mechanical linkage, but the result is, as the cam rotates it forces the valve open. The spring return closes the valve when the cam is no longer supplying the opening force.

The introduction of advanced technologies for air charging management still seems to be one of the more promising strategies to improve engine performance, efficiency, and, to some extent, pollutant emissions. In recent years, several kinds of variable valve actuation strategies have been implemented in engines in different forms, ranging from mechanical 2-step cam phasers, continuously variable cam phasers, cam profile switching mechanisms. By these systems, some flexibility for both timing and valve lift has been obtained. The actual level of benefits achievement is limited by the actual capabilities of each specific type of valve train system, but, in general, this flexibility gives an appreciable contribution in the effort of overcoming the classical engine tuning trade-offs (e.g. power vs. efficiency, power vs. torque).

Cylinder deactivation is used to reduce fuel consumption and emissions by motor vehicles during light-load operation. The possibility of shutting down one or more cylinders in internal combustion engines having a large number of cylinders during light-load operation of the vehicle, e.g., when driving downhill, is being considered. In typical light-load driving conditions, only 30% of an engine's maximum power is used, but all the cylinders have to be operated at partial load which is not beneficial in terms of fuel consumption and emissions. Shutting down one or more cylinders results in a significant reduction in fuel consumption because when the cylinders that have been deactivated follow passively, they consume much less fuel than the cylinders that have not been deactivated. Generally, cylinder deactivation is the deactivation of the intake and/or exhaust valves of a cylinder or cylinders during at least a portion of the combustion process thereby reducing pumping work, and is a proven method by which fuel economy can be improved. In effect, cylinder deactivation reduces the number of engine cylinders within which the combustion process is taking place. With fewer cylinders performing combustion, fuel efficiency is increased. For example, in an eight-cylinder engine under certain operating conditions, four of the eight cylinders can be deactivated. Thus, combustion would be taking place in only four, rather than in all eight, cylinders. Cylinder deactivation is effective, for example, during part-load conditions when full engine power is not required for smooth and efficient engine operation.

One of the reasons for the popularity of the camshaft systems in the ICE is their inherent synchronization with the piston movement. However, this means the engine can only be optimized for a certain engine speed and load and significant efficiency increases can be gained if the valve timing could be varied. Camshaft-based variable valve timing (VVT) can be applied, but these systems are limited due to their mechanics and hence not fully variable. Furthermore, camshaft-based systems do not allow variable valve lift (VVL) and only supports variable valve timing. Variable valve lift (VVL) is an automotive piston engine technology that varies the height of a valve opening in order to improve performance, fuel economy, or emissions. There are two main types of VVL: discrete, which employs fixed valve lift amounts, and continuous, which is able to vary the amount of lift. Continuous valve lift systems typically allow for the elimination of the valve. When used in conjunction with variable valve timing, variable valve lift can potentially offer infinite control over the intake and exhaust valve timing. Thus, a solution for improving the overall performance of the vehicle may be is to get rid of the camshaft altogether and use e.g. pneumatics or hydraulics to power a fully variable valve train (FVVT) that also is variable for each valve and cycle to cycle.

It is known in the prior arts which describes a method and apparatus for hydraulically actuating a gas exchange valve using a low-pressure, substantially constant flow fluid source applied to at least one actuator cylinder piston coupled to the gas exchange valve. A pressure sensor is used to monitor the pressure to provide feedback about the operation of the system and to provide variable motion control of the gas exchange valve. Similarly, some prior arts relate to a pneumatic system for controlling the valves of an internal combustion engine. However, the pneumatic system as disclosed in the prior arts also uses a cam that is operated by a drive shaft via a mechanical transmission. Further, many prior art devices have only two positions, either completely engaged or completely disengaged, causing that particular cylinder to be inactive for that engine cycle. Therefore, it is desirable to provide a system for controlling the operation of the valves in the internal combustion engine that does not have limitations associated with prior art systems. It is also desirable to provide an apparatus for controlling the operation of a valve in the internal combustion engine that has more than two positions.

The present disclosure is directed to overcome one or more limitations stated above or any other limitations associated with the prior art.

BRIEF SUMMARY OF THE INVENTION

The present disclosure overcomes one or more drawbacks of conventional arrangements as described in the prior art and provides additional advantages through an arrangement as claimed in the present disclosure. Additional features and advantages are realized through the techniques of the present disclosure. Other embodiments and aspects of the disclosure are described in detail herein and are considered a part of the claimed disclosure.

The present disclosure discloses a pneumatic actuator for controlling one or more engine valves of an internal combustion engine. The pneumatic actuator comprises an actuating chamber and a piston rod mounted slidingly inside the actuating chamber. At least one pneumatic control device is operationally configured with the pneumatic actuator, at least one sensor configured to sense an engine parameter and to transmit a signal to the pneumatic control device. The pneumatic actuator is configured to achieve the opening and closing of the engine valves for a predetermined period based on the signal received from the sensor corresponding to the engine parameters.

In an embodiment, the pneumatic control device is a pneumatic valve.

In an embodiment, the piston rod is configured for abutment with the engine valves of the internal combustion engine.

In an embodiment, the sensor is a rotary encoder coupled with a crankshaft of the internal combustion engine and rotates continuously about a rotational axis together with the crankshaft.

In one non-limiting embodiment of the present disclosure, a camless system for controlling one or more engine valves of an internal combustion engine is disclosed. The system comprises a pneumatic accumulator configured to store compressed air. A plurality of pneumatic actuators is configured for abutment with the engine valves of the internal combustion engine. The system further comprises at least one pneumatic control device fluidly connected between the pneumatic accumulator and the pneumatic actuator, at least one sensor configured to sense an engine parameter and to transmit a signal to the pneumatic control device. The plurality of pneumatic actuators are operationally configured with the pneumatic control device to achieve the opening and closing of the engine valves for a predetermined period based on the signal received from the sensor corresponding to the engine parameters.

In an embodiment, the pneumatic control device is a pneumatic valve.

In an embodiment, the pneumatic actuator comprises an actuating chamber and a piston rod mounted slidingly inside the actuating chamber and configured for abutment with the engine valves of the internal combustion engine.

In one non-limiting embodiment of the present disclosure, a camless system for controlling one or more engine valves of an internal combustion engine is disclosed. The system comprises a pneumatic accumulator configured to store compressed air, with at least one pneumatic actuator having a piston rod. The pneumatic actuator is configured for abutment with the engine valve of the internal combustion engine. The system further comprises at least one pneumatic control valve fluidly connected between the pneumatic accumulator and the pneumatic actuator, at least one sensor configured to sense an engine parameter and to transmit a signal to actuate the pneumatic control valves and an electronic control unit configured to control the pneumatic valves based on the signal received from the sensor. An inlet valve and an exhaust valve are operationally configured with the electronic control unit so as to achieve opening and closing of the valves for a predetermined time period based on the signal received from the sensor corresponding to the engine parameters.

In an embodiment, the sensor is a rotary encoder coupled with a crankshaft of the internal combustion engine and rotates continuously about a rotational axis together with the crankshaft.

In an embodiment, a plurality of sensors are configured to sense various engine parameters of the internal combustion engine.

In an embodiment, the camless system comprises a piston rod extension ring configured to rigidly attached with the piston rod of the pneumatic actuator.

In an embodiment, a variable valve lift mechanism is configured to control a stroke of the piston rod with an actuation of the piston rod extension ring.

In an embodiment, the camless system comprises an air supply passage connected to the pneumatic actuator for supplying the compressed air to the pneumatic actuator and an air relief passage connected to the pneumatic actuator for releasing air from the pneumatic actuator.

In an embodiment, the pneumatic control valve is configured to selectively modify pressurized air from the pneumatic accumulator to the pneumatic actuator in response to the signal received from the electronic control unit.

In an embodiment, the pneumatic control valve is a 3/2 pneumatic valve.

In an embodiment, the piston rod is provided with an elastic return means configured to push the piston rod towards an initial position after the release of compressed air from the pneumatic actuator.

In an embodiment, the pneumatic control valve is a 5/2 pneumatic valve.

In an embodiment, a method for controlling valves of the internal combustion engine using the camless system is disclosed. The method includes sensing the engine parameters by the sensor and transmitting the signal to the electronic control unit. After which sending the activation signal from the electronic control unit to the pneumatic control valve to actuate the pneumatic actuator in response to the signal received from the sensor. Lastly, adjusting the opening and closing of the inlet valve and the exhaust valve of the internal combustion engine for a predetermined time period based on the signal received from the sensor corresponding to the engine parameters.

In an embodiment, an internal combustion engine, having one or more cylinders, comprising the plurality of pneumatic actuators, for each cylinder is disclosed. The plurality of pneumatic actuators is configured to selectively activate or deactivate one or more cylinders of the internal combustion engine.

In an embodiment, an internal combustion engine, having one or more cylinders, comprising the camless system, for each cylinder is disclosed. The camless system is configured to selectively activate or deactivate one or more cylinders of the internal combustion engine.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The novel features and characteristics of the disclosure are set forth in the appended description. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which.

Figure 1:
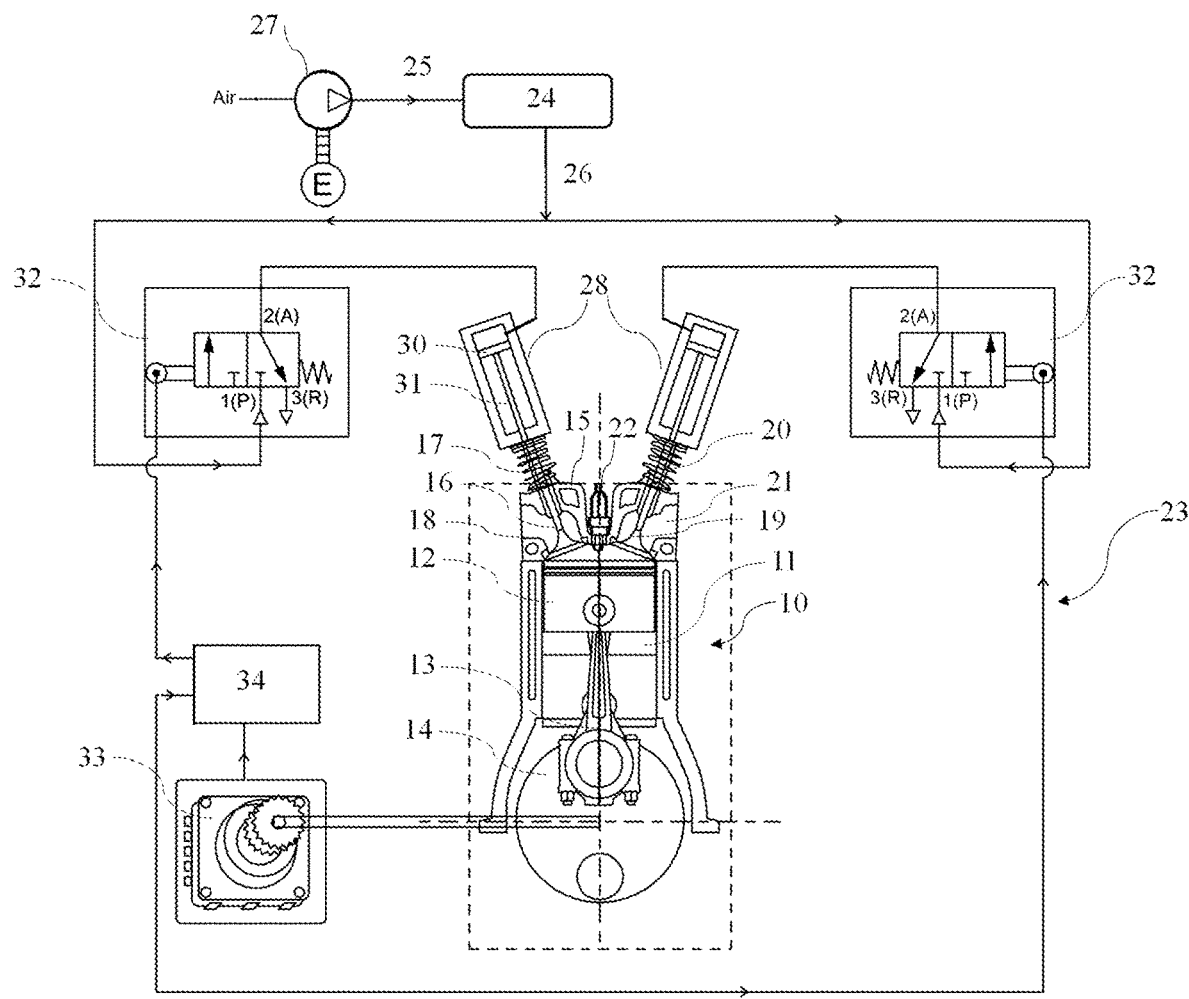
FIG. 1 illustrates a schematic view of a camless system in accordance with an embodiment of the present disclosure.

The figures depict embodiments of the disclosure for purposes of illustration only. One skilled in the art will readily recognize from the following description that alternative embodiments of the assemblies and methods illustrated herein may be employed without departing from the principles of the disclosure described herein.

DETAILED DESCRIPTION OF THE INVENTION

While the embodiments in the disclosure are subject to various modifications and alternative forms, specific embodiment thereof has been shown by way of example in the figures and will be described below. It should be understood, however, that it is not intended to limit the disclosure to the particular forms disclosed, but on the contrary, the disclosure is to cover all modifications, equivalents, and alternatives falling within the scope of the disclosure.

It is to be noted that a person skilled in the art would be motivated from the present disclosure and modify a system and method for controlling valves of an internal combustion engine as disclosed herein. However, such modifications should be construed within the scope of the disclosure. Accordingly, the drawings show only those specific details that are pertinent to understand the embodiments of the present disclosure, so as not to obscure the disclosure with details that will be readily apparent to those of ordinary skill in the art having the benefit of the description herein.

The terms "comprises", "comprising", or any other variations thereof used in the disclosure, are intended to cover a non-exclusive inclusion, such that a system and method that comprises a list of components does not include only those components but may include other components not expressly listed or inherent to such system, method, or assembly, or device. In other words, one or more elements in a system or device proceeded by "comprises . . . a" does not, without more constraints, preclude the existence of other elements or additional elements in the system or device.

Accordingly, the present disclosure relates to a pneumatic actuator for controlling one or more engine valves of an internal combustion engine. The pneumatic actuator comprises an actuating chamber and a piston rod mounted slidingly inside the actuating chamber. At least one pneumatic control device is operationally configured with the pneumatic actuator, at least one sensor configured to sense an engine parameter and to transmit a signal to the pneumatic control device. The pneumatic actuator is configured to achieve the opening and closing of the engine valves for a predetermined period based on the signal received from the sensor corresponding to the engine parameters.

In an embodiment, the pneumatic control device is a pneumatic valve.

In an embodiment, the piston rod is configured for abutment with the engine valves of the internal combustion engine.

In an embodiment, the sensor is a rotary encoder coupled with a crankshaft of the internal combustion engine and rotates continuously about a rotational axis together with the crankshaft.

In an exemplary embodiment, a camless system for controlling one or more engine valves of an internal combustion engine is disclosed. The system comprises a pneumatic accumulator configured to store compressed air. A plurality of pneumatic actuators is configured for abutment with the engine valves of the internal combustion engine. The system further comprises at least one pneumatic control device fluidly connected between the pneumatic accumulator and the pneumatic actuator, at least one sensor configured to sense an engine parameter and to transmit a signal to the pneumatic control device. The plurality of pneumatic actuators are operationally configured with the pneumatic control device to achieve the opening and closing of the engine valves for a predetermined period based on the signal received from the sensor corresponding to the engine parameters.

In an embodiment, the pneumatic control device is a pneumatic valve.

In an embodiment, the pneumatic actuator comprises an actuating chamber and a piston rod mounted slidingly inside the actuating chamber and configured for abutment with the engine valves of the internal combustion engine.

In an exemplary embodiment, a camless system for controlling one or more engine valves of an internal combustion engine is disclosed. The system comprises a pneumatic accumulator configured to store compressed air, with at least one pneumatic actuator having a piston rod. The pneumatic actuator is configured for abutment with the engine valve of the internal combustion engine. The system further comprises at least one pneumatic control valve fluidly connected between the pneumatic accumulator and the pneumatic actuator, at least one sensor configured to sense an engine parameter and to transmit a signal to actuate the pneumatic control valves and an electronic control unit configured to control the pneumatic valves based on the signal received from the sensor. An inlet valve and an exhaust valve are operationally configured with the electronic control unit so as to achieve opening and closing of the valves for a predetermined time period based on the signal received from the sensor corresponding to the engine parameters.

In an embodiment, the sensor is a rotary encoder coupled with a crankshaft of the internal combustion engine and rotates continuously about a rotational axis together with the crankshaft.

In an embodiment, a plurality of sensors are configured to sense various engine parameters of the internal combustion engine.

In an embodiment, the camless system comprises a piston rod extension ring configured to rigidly attached with the piston rod of the pneumatic actuator.

In an embodiment, a variable valve lift mechanism is configured to control a stroke of the piston rod with an actuation of the piston rod extension ring.

In an embodiment, the camless system comprises an air supply passage connected to the pneumatic actuator for supplying the compressed air to the pneumatic actuator and an air relief passage connected to the pneumatic actuator for releasing air from the pneumatic actuator.

In an embodiment, the pneumatic control valve is configured to selectively modify pressurized air from the pneumatic accumulator to the pneumatic actuator in response to the signal received from the electronic control unit.

In an embodiment, the pneumatic control valve is a 3/2 pneumatic valve.

In an embodiment, the piston rod is provided with an elastic return means configured to push the piston rod towards an initial position after the release of compressed air from the pneumatic actuator.

In an embodiment, the pneumatic control valve is a 5/2 pneumatic valve.

In an embodiment, a method for controlling valves of the internal combustion engine using the camless system is disclosed. The method includes sensing the engine parameters by the sensor and transmitting the signal to the electronic control unit. After which sending the activation signal from the electronic control unit to the pneumatic control valve to actuate the pneumatic actuator in response to the signal received from the sensor. Lastly, adjusting the opening and closing of the inlet valve and the exhaust valve of the internal combustion engine for a predetermined time period based on the signal received from the sensor corresponding to the engine parameters.

In an embodiment, an internal combustion engine, having one or more cylinders, comprising the plurality of pneumatic actuators, for each cylinder is disclosed. The plurality of pneumatic actuators is configured to selectively activate or deactivate one or more cylinders of the internal combustion engine.

The following paragraphs describe the present disclosure with reference to FIGS. 1-6. In the figures, the same element or elements which have similar functions are indicated by the same reference signs.

FIG. 1 illustrates a schematic view of an internal combustion engine 10 in accordance with an embodiment of the present disclosure. The internal combustion engine 10 may be provided with a plurality of cylinders (only one of which is illustrated in FIG. 1), each of which is connected to an intake manifold by means of at least one inlet valve 16 and to an exhaust manifold by means of at least one exhaust valve 19. Both the inlet and the exhaust valve 16, 19 include a valve head. The valves 16, 17 have an elongated cylindrical valve stem extending from the valve head. The valve head 16 is biased against a valve seat by a helical compression valve spring 17, 20. The intake manifold receives fresh air (i.e. air from the atmosphere) through a feed conduit and is connected to the cylinders 11 by means of respective intake ducts 18, each of which is controlled by the relative inlet valve 16. Likewise, the exhaust manifold is connected to the cylinders 11 by means of respective exhaust ducts 21, each of which is controlled by the relative exhaust valve 19. In each of the cylinders, a combustion chamber is formed between a piston 12 slidably received in each cylinder 11 and a cylinder head 15. A connecting rod 13 provides the mechanical linkage between the piston 12 and a crankshaft 14. According to the embodiment, as illustrated in FIG. 1, a fuel injector 22 is arranged so as to inject the fuel directly into the cylinders 11. According to an alternative embodiment, a spark plug (not shown) is configured in case of a petrol engine to inject the fuel directly into the cylinders 11. According to another embodiment that is not illustrated, the fuel is injected into each intake duct 18 via the fuel injector 22 arranged close to the inlet valve 16.

FIG. 1 further illustrates a camless system 23 for controlling the valves 16, 19 of the internal combustion engine 10 in accordance with an embodiment of the present disclosure. The camless system 23 comprises a pneumatic accumulator 24 configured to store compressed air, an air compressor 27 to maintain the pneumatic accumulator 24 under required pressure, at least one pneumatic actuator 28 with a piston rod 31 configured for abutment with the engine valve 16, 19 of the internal combustion engine 10, and at least one pneumatic control valve 32 fluidly connected between the pneumatic accumulator 24 and the pneumatic actuator 28. The camless system 23 further comprises a sensor 33 configured to sense an engine parameter and to transmit a signal to actuate the pneumatic control valves 32 and an electronic control unit 34 configured to control the pneumatic valves 32 based on the signal received from the sensor 33. The camless system 23 is configured to achieve the opening and closing of the valves for a predetermined period based on the signal received from the sensor 33 corresponding to the engine parameters. The pneumatic actuator 28 of the camless system is installed on the engine valves 16, 19 of the internal combustion engine 10. The piston rod 31 of the pneumatic actuator 28 is mechanically linked with the engine valves 16, 19 such that actuation of the piston rod 31, actuates at least one of the inlet valve 16 and the exhaust valve 19.

The pneumatic accumulator 24 can be a compressed air container that is specifically provided to store compressed air. Advantageously, the pneumatic accumulator 24 is configured to supply compressed air to one or more pneumatic valves 32. The pneumatic accumulator 24 is equipped with an inlet 25 for supplying compressed air, for example by the compressor 27. In an embodiment, the compressor 27 is operated by a drive shaft of the internal combustion engine 10 or by an electric motor of its own. Furthermore, the pneumatic accumulator 24 is equipped with an outlet 26 for supplying compressed air to the pneumatic valves 32. In a preferred embodiment, a nominal value of the pressure inside the pneumatic accumulator is approximately 5-10 bar.

Figure 4:
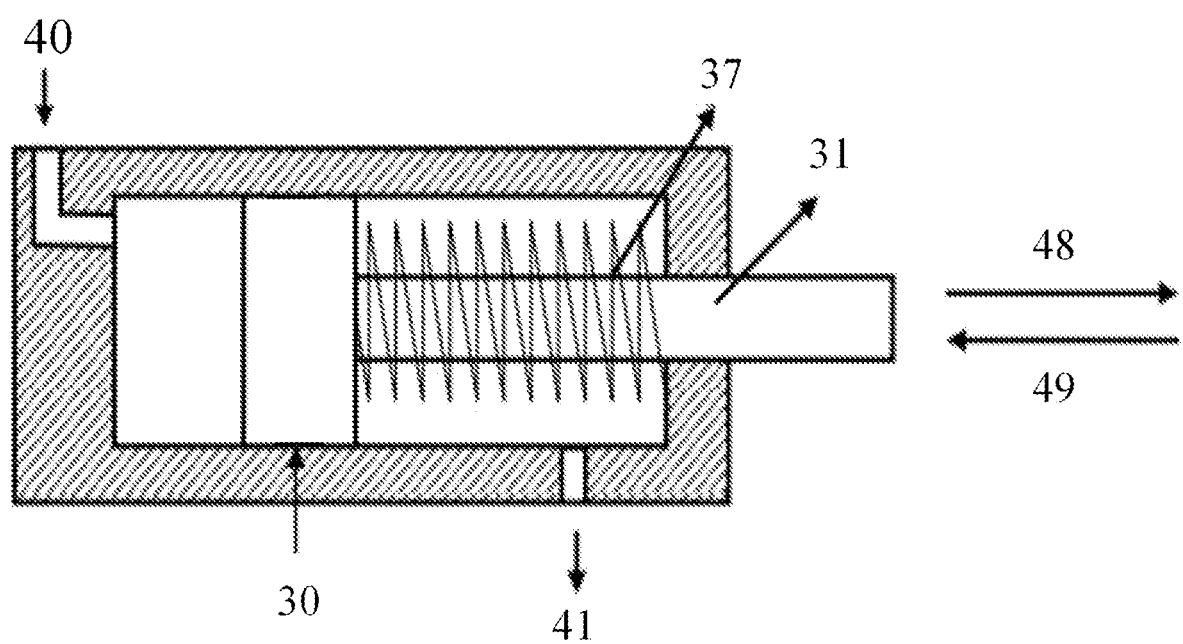
FIG. 4 illustrates working of a pneumatic cylinder connected to the 3/2 pneumatic control valves in accordance with an embodiment of the present disclosure.
Figure 5:
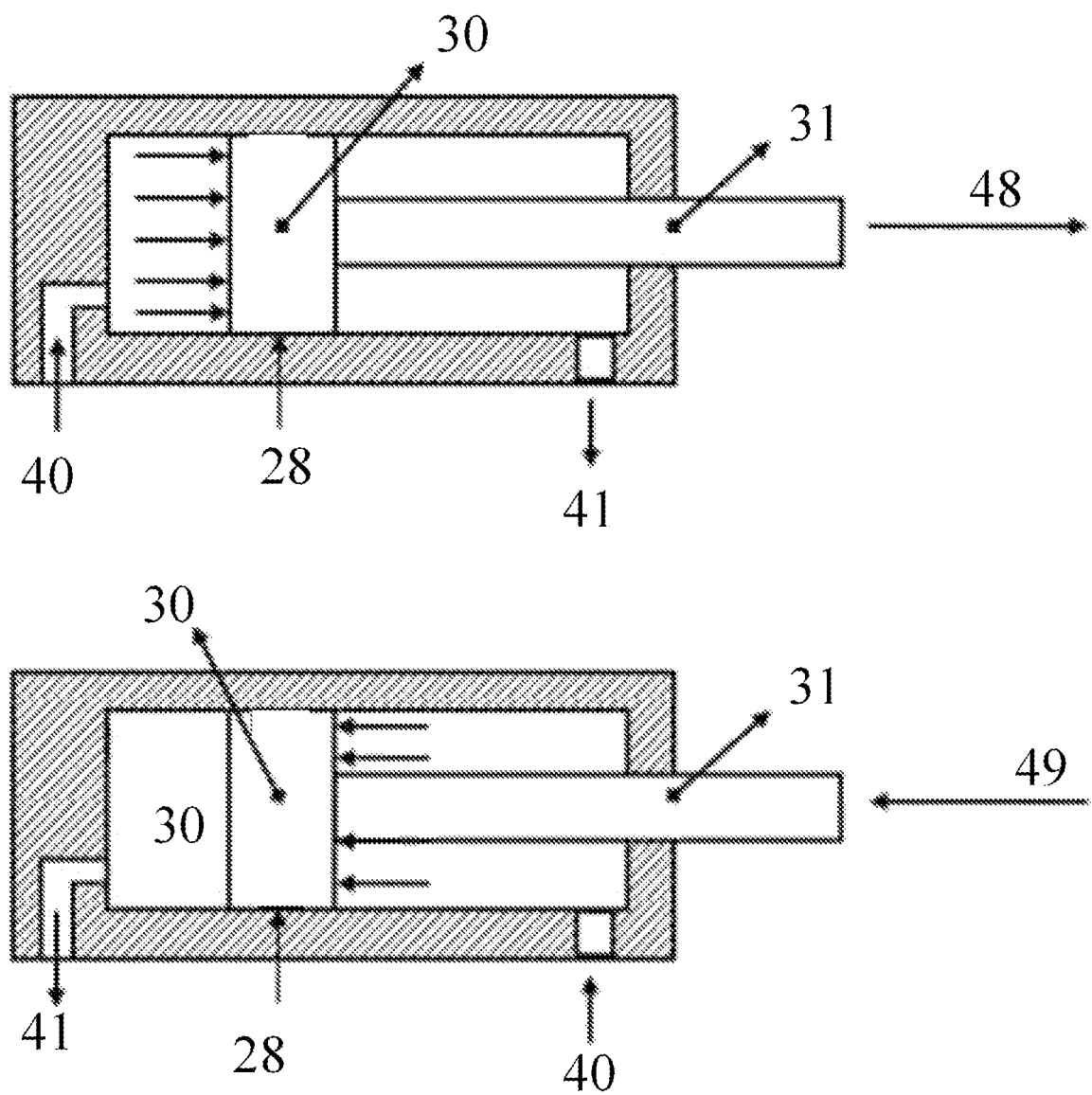
FIG. 5 illustrates working of a pneumatic cylinder connected to the 5/2 pneumatic control valves in accordance with an embodiment of the present disclosure.

The pneumatic actuator 28 comprising a cylinder piston 30 that moves in response to the pneumatic air supplied to the pneumatic actuator 28. In the embodiment, the cylinder piston 30 comprises the piston rod 31 that is extended from and retracted into the pneumatic actuator 28. The pneumatic actuator 28 further includes an air supply passage 40 and an air relief passage 41. The air supply passage 40 is connected to the pneumatic actuator 28 for supplying the compressed air to the pneumatic actuator 28. The air relief passage 41 is defined in the pneumatic actuator 28 for releasing air from the pneumatic actuator 28. In an embodiment, the pneumatic actuator 28 is a single-acting cylinder as shown in FIG. 4. The single-acting cylinder has an inlet port 47 on one side of the piston rod 31 which is configured to push the piston rod 31 forward. However, to return the piston rod 31 to its initial position, the piston rod 31 may be provided with an elastic return means 37 configured to push the piston rod 31 towards an initial position after the release of compressed air from the pneumatic actuator 28. In an embodiment, the elastic return means 37 is a spring that is configured to get compressed by an extension stroke 48 of the cylinder piston 30. In an embodiment, the spring is configured outside a cylinder body. In an alternate embodiment, valve springs are provided for the return stroke. In another embodiment, the pneumatic actuator 28 is a double-acting cylinder as shown in FIG. 5. The double-acting pneumatic cylinder is one where the thrust is developed in both extending and retracting directions. The double-acting cylinder has a port on each side of the cylinder piston 30 which helps to push the piston rod 31 in extension stroke 48 and the return stroke 49. In this configuration, the return stroke 49 does not need the elastic return means 37.

Figure 2:
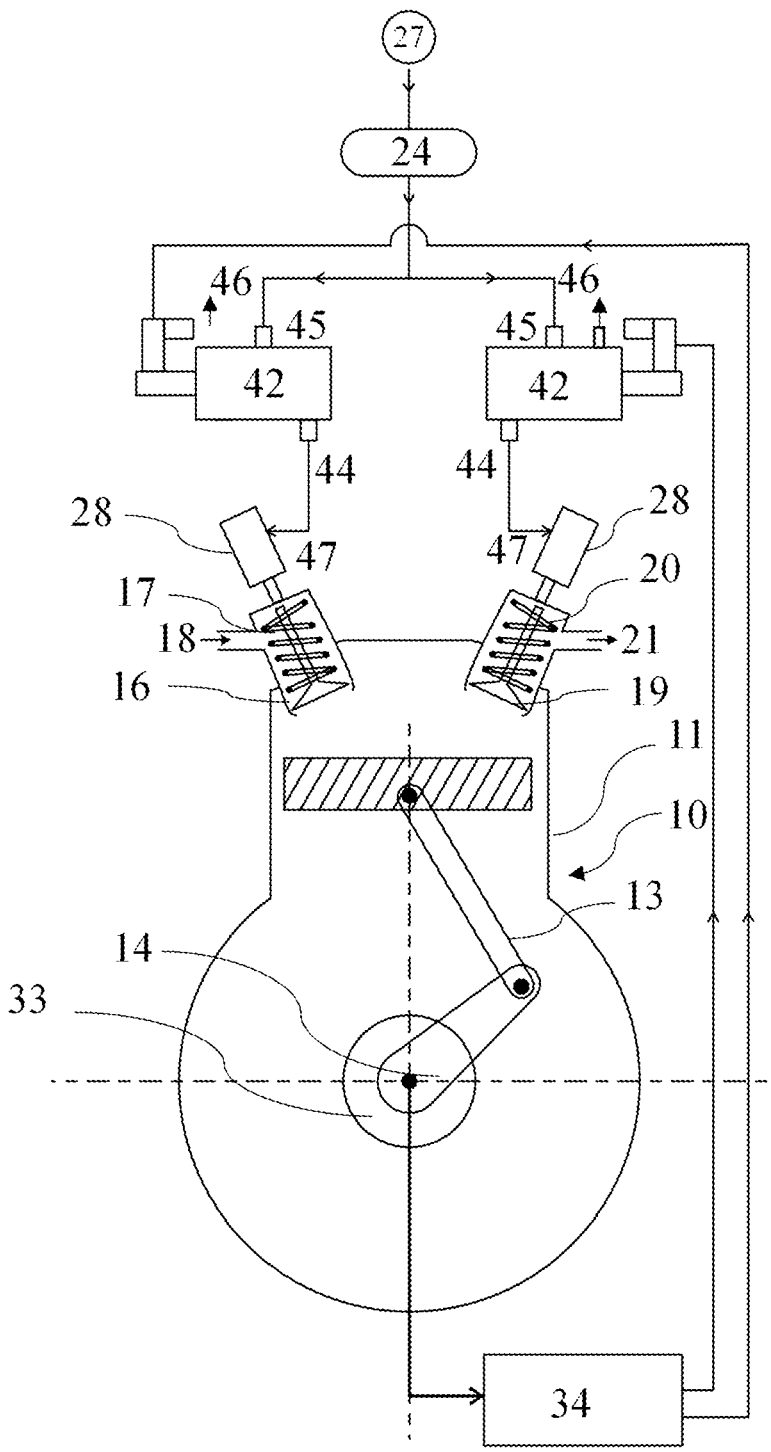
FIG. 2 illustrates a schematic view of the camless system having 3/2 pneumatic control valves in accordance with an embodiment of the present disclosure.
Figure 3:
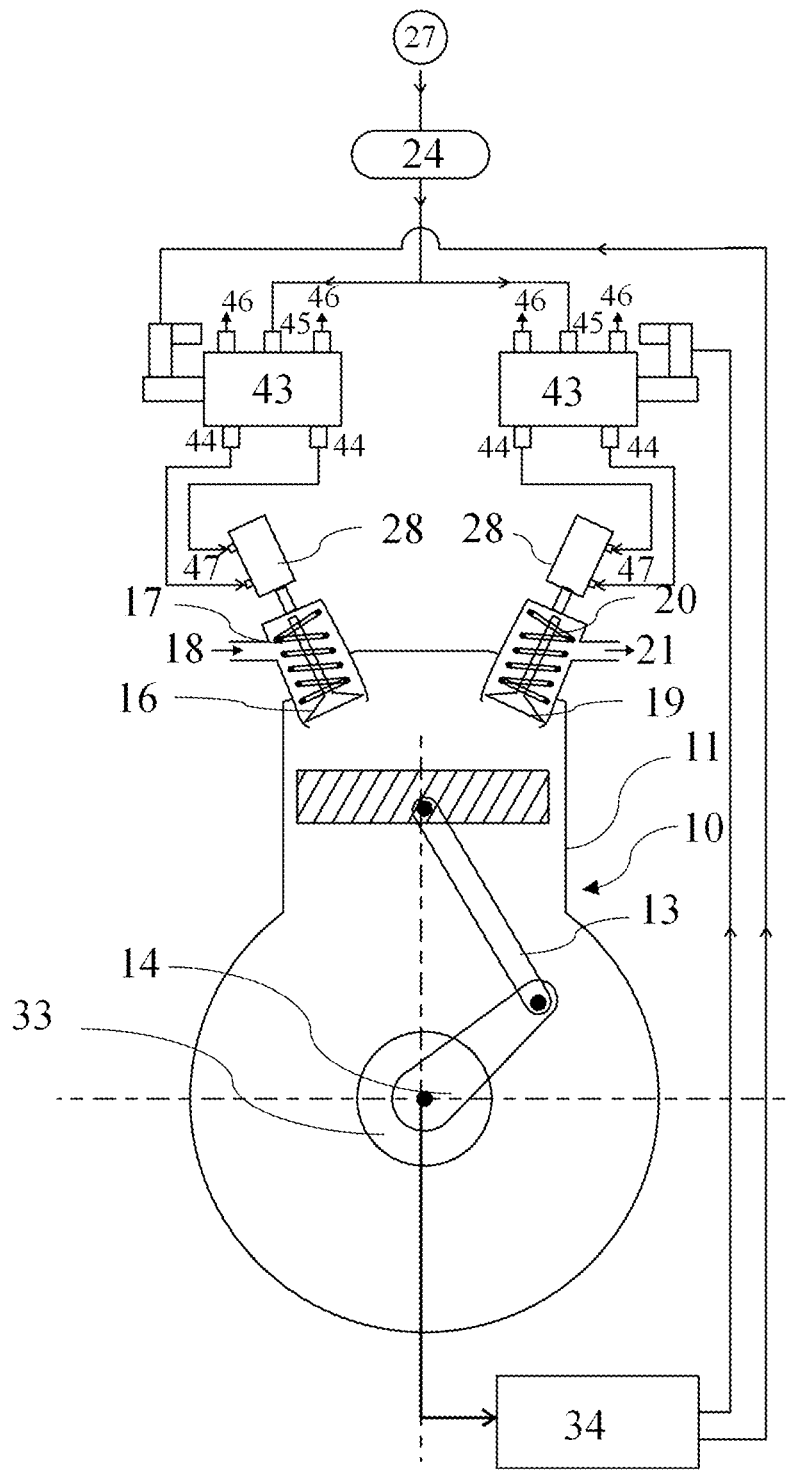
FIG. 3 illustrates a schematic view of the camless system having 5/2 pneumatic control valves in accordance with an embodiment of the present disclosure.

The pneumatic control valve 32 is fluidly connected between the pneumatic accumulator 24 and the pneumatic actuator 28. The pneumatic control valve 32 selectively supplies compressed air to the pneumatic actuator 28 in order to actuate the pneumatic actuator 28 and extend the piston rod 31 in the forward direction. Further, the pneumatic control valve 32 is configured to selectively modify pressurized air from the pneumatic accumulator 24 to the pneumatic actuator 28 in response to the signal received from the electronic control unit 34. In an alternative embodiment, a pneumatic control device is operationally configured with the pneumatic actuator 28. The plurality of sensors are configured to sense the engine parameter and transmit the signal to the pneumatic control device. In an embodiment, the pneumatic control device is a pneumatic valve 32. In a preferred embodiment, if the pneumatic actuator 28 is of single acting cylinder type, then a 3/2 pneumatic valve 42 is used whereas, if the pneumatic actuator 28 is of the double-acting cylinder then a 5/2 pneumatic valve 43 is used. The 3/2 pneumatic valve 42 is configured to have one supply port 44 to the pneumatic actuator 28, one exhaust port 46, and one inlet port 45 for the compressed air as shown in FIG. 2. The 5/2 pneumatic valve 43 is configured to have two supply ports 44 to each port of the pneumatic actuator 28, two exhaust ports 46, and one inlet port 45 for compressed air.

The electronic control unit 34 is configured to control the pneumatic valves 32. The electronic control unit 34 is coupled to one or more sensors 33 and the pneumatic valves 32. The sensors 33 are configured to sense the engine parameters and to transmit the signal to actuate the pneumatic control valves 32. The electronic control unit 34 controls the operation of the pneumatic valves 32 in order to control the operation of the pneumatic actuator 28. In some embodiments, the electronic control unit 34 can also receive valve feedback information from the pneumatic valves 32. The electronic control unit 34 receives one or more feedback values of the engine parameters from one or more sensors. The one or more sensors can comprise any manner of feedback sensors that are related to sensing the engine parameters such as the feedback of the engine power, speed, torque, and efficiency required by the engine as per the data provided by a driver at instant accelerator values and load values of the vehicle. In a preferred embodiment, the sensor 33 is a rotary encoder that is rotationally coupled with the crankshaft 14 of the internal combustion engine 10 and rotates continuously about a rotational axis together with the crankshaft 14 as shown in FIG. 1. In an embodiment, the electronic control unit 34 is configured to receive signal or inputs or feedback from a main electronic control unit already present in the internal combustion engine. In an embodiment, one or more feedback sensors comprise a displacement sensor, a force sensor, a pressure sensor. The electronic control unit 34 is electrically coupled to the displacement sensor, to the force sensor, to the pressure sensor. The one or more feedback values obtained by the sensors are used by the electronic control unit 34 to control the actuation of the pneumatic actuator 28.

Figure 6:
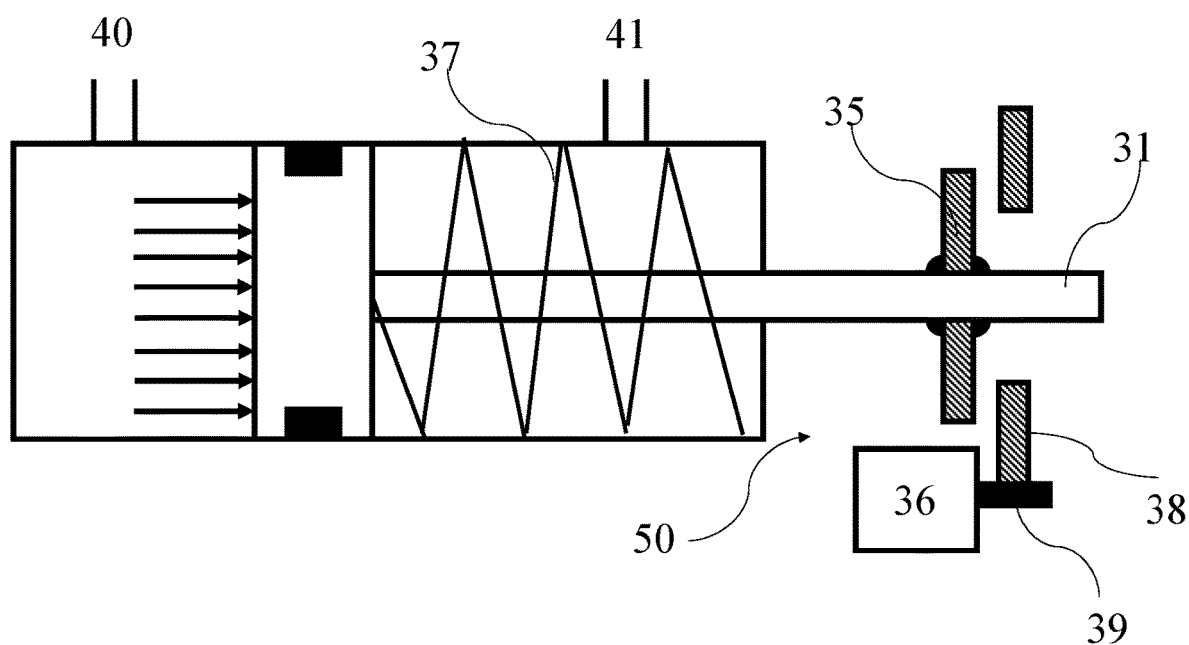
FIG. 6 illustrates a schematic view of a variable valve lift mechanism configured to control a lift of a piston rod in accordance with an embodiment of the present disclosure.

In an embodiment, a variable valve lift mechanism 50 of the internal combustion engine 10 is provided for variably controlling at least an intake valve lift of engine valves 16, 19 as shown in FIG. 6. The variable valve lift mechanism 50 is provided for variably controlling or adjusting a valve lift amount of the inlet valve 16 and/or the exhaust valve 19. The variable valve lift mechanism 50 comprises a piston rod extension ring 35, a stopper ring 38 with a guide, a screw 39, and a servomotor 36. The piston rod extension ring 35 is configured to be rigidly attached with the piston rod 31 of the pneumatic actuator 28. The servomotor 36 is configured to control a lift of the piston rod 31 with a variable actuation of the piston rod extension ring 35. The electronic control unit 34 is electrically coupled with the servomotor 36 and sends a signal for the actuation of the servomotor 36. The screw 39 is connected to the servomotor 36 such that, when the servomotor 36 is in operation the screw 39 will rotate the stopper ring 38. The stopper ring 38 with the guides is configured to limit the piston rod 31 by abutting the piston rod extension ring 35. The stopper ring 38 is allowed to linearly displace about an axis of the pneumatic actuator 28.

The working of the variable valve lift mechanism 50 in accordance with the present disclosure is now explained. Initially, the stroke length of the pneumatic actuator 28 is such that to obtain a maximum valve lift. However, in an instance, if the valve lift needs to be reduced then the variable valve lift mechanism 50 gets activated by activating the servomotor 36 connected to the electronic control unit 34. Once the servomotor 36 gets started it starts rotating the screw 39 which in turn moves the stopper ring 38. Due to this phenomenon, the stopper ring 38 starts moving towards the direction of the pneumatic actuator 28 and restricts the movement of the piston rod extension ring 35, and causes a lesser valve lift to the engine valves 16, 19. The variable valve lift mechanism 50 may be configured to operate in multiple operating modes based on engine operating conditions, such as based on whether the engine is performing a cold engine start, a warmed-up engine operation, engine speed-load conditions, etc. Based on the mode of operation, the variable valve lift mechanism 50 may be configured to open only a subset of exhaust ports of a subset of cylinders, with all other exhaust ports closed. Additionally, the variable valve lift mechanism 50 may be configured to selectively open and close the intake ports in correspondence to the opening and closing of the exhaust ports during the various operating modes.

A method for controlling valves of the internal combustion engine 10 using the camless system 23 is now described. The method comprises sensing the engine parameters by the sensor 33 and transmitting the signal to the electronic control unit 34. In an embodiment, the rotary encoder is configured to sense the position of the crankshaft 14 and to transmit the signal to the electronic control unit 34. After receiving the signals from the sensor 33, the electronic control unit 34 sends the activation signal to the pneumatic control valve 32 to actuate the pneumatic actuator 28 in response to the signal received from the sensor 33. The electronic control unit 34 further adjusts the opening and closing of the inlet valve 16 and the exhaust valve 19 of the internal combustion engine 10 for a predetermined period based on the signal received from the sensor 33 corresponding to the engine parameters.

The camless system 23 for controlling the engine valves of the internal combustion engine 10 and the method for controlling the engine valves as disclosed herein may be incorporated without any change in the overall assembly of the internal combustion engine 10. In comparison with the cylinder deactivation operations known from the state of the art, the proposed camless system 23 offers great advantages. In addition, it is possible to deactivate either just one cylinder by means of the disclosed camless system or to deactivate several cylinders with several such camless systems in case of need. The camless system 23 as disclosed in the present disclosure is used to actuate the inlet and outlet valves of the engine 10, which further gives freedom to operate the valves whenever and for whatever duration required. The proposed disclosure also uses a precise rotary positioning sensor with a degree of accuracy in few milliseconds with the capacity to detect the rotary position of the crankshaft 14. The configuration of the camless system 23 described above may be used to provide control of the amount and timing of air supplied to, and exhausted from, the cylinders 11. In an embodiment, a grouping of two or more cylinders may be based on various factors such as a firing order, a location of the cylinders on the engine based on the specific engine configuration, as well as a configuration of the exhaust manifold e.g., whether the exhaust manifold is segmented, integrated, etc.

It is to be understood that a person of ordinary skill in the art may develop a system of similar configuration without deviating from the scope of the present disclosure. Such modifications and variations may be made without departing from the scope of the present invention. Therefore, it is intended that the present disclosure covers such modifications and variations provided they come within the ambit of the appended claims and their equivalents.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms or both terms. For example, the phrase "A or B" will be understood to include the possibilities of "A" or "B" or "A and B." While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Reference numerals: | |
|---|---|
| Reference Number | Description |
| 10 | Internal Combustion Engine |
| 11 | Engine cylinder |
| 12 | Piston |
| 13 | Connecting rod |
| 14 | Crankshaft |
| 15 | Cylinder head |
| 16 | Inlet valve |
| 17 | Inlet valve spring |
| 18 | Intake duct |
| 19 | Exhaust valve |
| 20 | Exhaust valve spring |
| 21 | Exhaust duct |
| 22 | Fuel Injector |
| 23 | Camless system |
| 24 | Pneumatic accumulator |
| 25 | Inlet of pneumatic accumulator |
| 26 | Outlet of pneumatic accumulator |
| 27 | Air compressor |
| 28 | Pneumatic actuator |
| 30 | Cylinder piston |
| 31 | Piston rod |
| 32 | Pneumatic control valve |
| 33 | Sensor |
| 34 | Electronic control unit |
| 35 | Piston rod extension ring |
| 36 | Servomotor |
| 37 | Elastic return means |

-continued

| Reference numerals: | |
|---|---|
| Reference Number | Description |
| 38 | Stopper ring |
| 39 | Screw |
| 40 | Air supply passage |
| 41 | Air relief passage |
| 42 | 3/2 pneumatic valve |
| 43 | 5/2 pneumatic valve |
| 44 | Pneumatic valve supply port |
| 45 | Pneumatic valve inlet port |
| 46 | Pneumatic valve exhaust port |
| 47 | Pneumatic actuator inlet port |
| 48 | Extension stroke |
| 49 | Return stroke |
| 50 | Variable valve lift mechanism |

What is claimed is:

1. A pneumatic actuator for controlling one or more engine valves of an internal combustion engine, the pneumatic actuator comprising:
   an actuating chamber and a piston rod mounted slidingly inside the actuating chamber, the piston rod including a piston rod extension ring;
   at least one pneumatic control device operatively connected to the actuating chamber;
   at least one sensor configured to sense an engine parameter and to transmit a signal indicative of the engine parameter to the at least one pneumatic control device; and
   a variable valve lift mechanism including a stopper ring and a servomotor configured to selectively rotate the stopper ring so as to linearly displace the stopper ring along an axis of the piston rod,
   wherein the at least one pneumatic control device is configured to control the piston rod so as to alternately open and close the one or more engine valves for a predetermined period of time based on the signal received from the at least one sensor, and
   wherein the variable valve lift mechanism is configured to limit a stroke length of the piston rod when the piston rod extension ring abuts against the stopper ring.

2. The pneumatic actuator according to claim 1, wherein the at least one pneumatic control device includes a pneumatic valve.

3. The pneumatic actuator according to claim 1, wherein the piston rod is configured to abut the one or more engine valves.

4. The pneumatic actuator according to claim 1, wherein the at least one sensor is a rotary encoder coupled with a crankshaft of the internal combustion engine, the rotary encoder configured to rotate continuously with the crankshaft about a rotational axis of the crankshaft.

5. An internal combustion engine comprising:
   one or more cylinders, each cylinder including a plurality of pneumatic actuators according to claim 1,
   wherein in each cylinder, the plurality of pneumatic actuators is configured to selectively activate or deactivate the cylinder.

6. A camless system for controlling a plurality of engine valves of an internal combustion engine, the camless system comprising:
   a pneumatic accumulator configured to store compressed air;
   a plurality of pneumatic actuators configured to respectively abut the plurality of engine valves, each pneumatic actuator including a piston rod with a piston rod extension ring;
   at least one pneumatic control device fluidly connected between the pneumatic accumulator and the plurality of pneumatic actuators; and
   at least one sensor configured to sense an engine parameter and to transmit a signal indicative of the engine parameter to the at least one pneumatic control device;
   a plurality of variable valve lift mechanisms respectively associated with the plurality of pneumatic actuators, each variable valve lift mechanism including a stopper ring and a servomotor configured to selectively rotate the stopper ring so as to linearly displace the stopper ring along an axis of an associated piston rod of the plurality of pneumatic actuators,
   wherein the plurality of pneumatic actuators is operatively connected to the at least one pneumatic control device so as to alternately open and close the plurality of engine valves for a predetermined period of time based on the signal received from the at least one sensor, and
   wherein each variable valve lift mechanism is configured to limit a stroke length of the associated piston rod when the piston rod extension ring abuts against the stopper ring.

7. The camless system according to claim 6, wherein the at least one pneumatic control device includes a pneumatic valve.

8. The camless system according to claim 6, wherein each pneumatic actuator further includes an actuating chamber such that the piston rod is mounted slidingly inside the actuating chamber so as to abut an associated engine valve of the plurality of engine valves.

9. A camless system for controlling one or more engine valves of an internal combustion engine, the camless system comprising:
   a pneumatic accumulator configured to store compressed air;
   at least one pneumatic actuator including a piston rod configured to abut the one or more engine valves, the piston rod including a piston rod extension ring;
   at least one pneumatic control valve fluidly connected between the pneumatic accumulator and the at least one pneumatic actuator;
   an electronic control unit (ECU) configured to control the at least one pneumatic control valve;
   at least one sensor configured to sense an engine parameter and to transmit a signal indicative of the engine parameter to the ECU; and
   a variable valve lift mechanism including a stopper ring and a servomotor configured to selectively rotate the stopper ring so as to linearly displace the stopper ring along an axis of the piston rod,
   wherein the one or more engine valves include an inlet valve and an exhaust valve operatively connected to the ECU via the at least one pneumatic control valve and the at least one pneumatic actuator,
   wherein the ECU controls the at least one pneumatic control valve so as to alternately open and close the inlet and exhaust valves for a predetermined period of time based on the signal received from the at least one sensor, and wherein the variable valve lift mechanism is configured to limit a stroke length of the piston rod when the piston rod extension ring abuts against the stopper ring.

10. The camless system according to claim 9, wherein the at least one sensor is a rotary encoder coupled with a crankshaft of the internal combustion engine, the rotary encoder configured to rotate continuously with the crankshaft about a rotational axis of the crankshaft.

11. The camless system according to claim 9, wherein the at least one sensor comprises a plurality of sensors.

12. The camless system according to claim 9, further comprising:
    an air supply passage connected to the at least one pneumatic actuator, the air supply passage configured to supply the compressed air to the at least one pneumatic actuator; and
    an air relief passage connected to the at least one pneumatic actuator, the air relief passage configured to release the compressed air from the at least one pneumatic actuator.

13. The camless system according to claim 9, wherein the ECU is further configured to control the at least one pneumatic control valve so as to selectively modify a pressure of the compressed air supplied to the at least one pneumatic actuator from the pneumatic accumulator.

14. The camless system according to claim 9, wherein the pneumatic control valve is a 3/2 pneumatic valve.

15. The camless system according to claim 14, wherein the at least one pneumatic actuator further includes an elastic return means configured to push the piston rod towards an initial position when the compressed air is released from the at least one pneumatic actuator.

16. The camless system according to claim 9, wherein the pneumatic control valve is a 5/2 pneumatic valve.

17. A method for using the camless system according to claim 9, the method comprising:
    sensing engine parameters via the at least one sensor and transmitting the signal indicative of the engine parameters to the ECU;
    transmitting an activation signal from the ECU to the at least one pneumatic control valve so as to actuate the at least one pneumatic actuator, the activation signal based on the signal from the at least one sensor;
    alternately opening and closing the inlet and exhaust valves for the predetermined period of time based on the activation signal;
    rotating the stopper ring via the servomotor so as to linearly displace the stopper ring along an axis of the piston rod; and
    limiting a stroke length of the piston rod when the piston rod extension ring abuts against stopper ring.

18. An internal combustion engine comprising:
    one or more cylinders; and
    the camless system according to claim 9,
    wherein the camless system is configured to selectively activate or deactivate the one or more cylinders.

* * * * *